W. L. HANLEY, Jr.
APPARATUS FOR HACKING BRICKS.
APPLICATION FILED SEPT. 21, 1920.
1,413,402.
Patented Apr. 18, 1922.
3 SHEETS—SHEET 2.
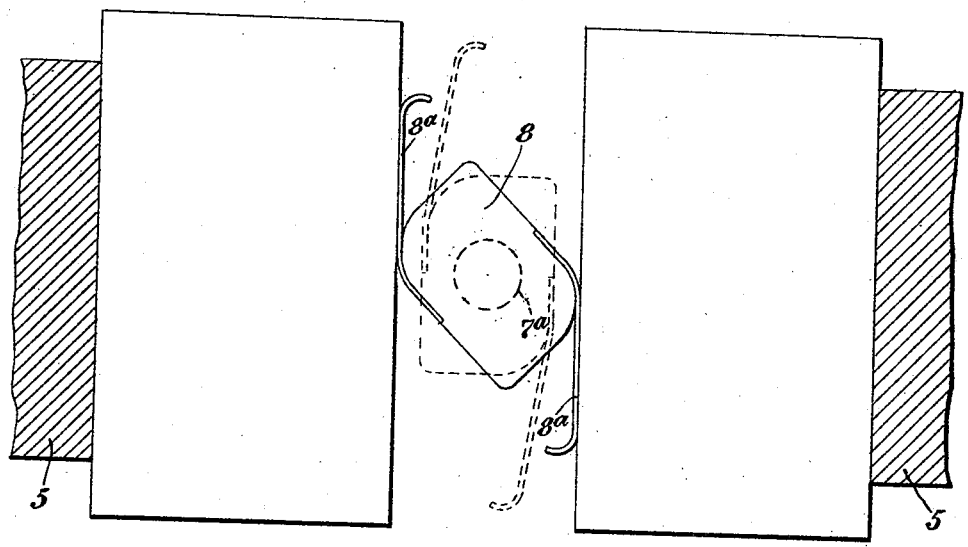
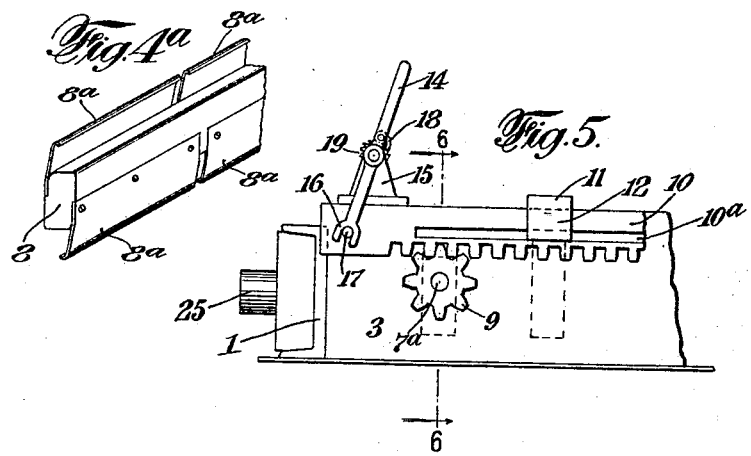
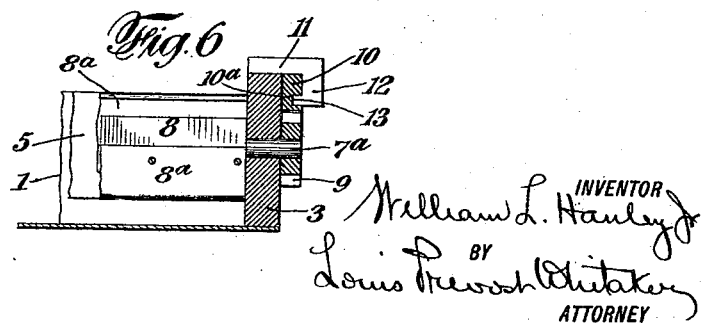

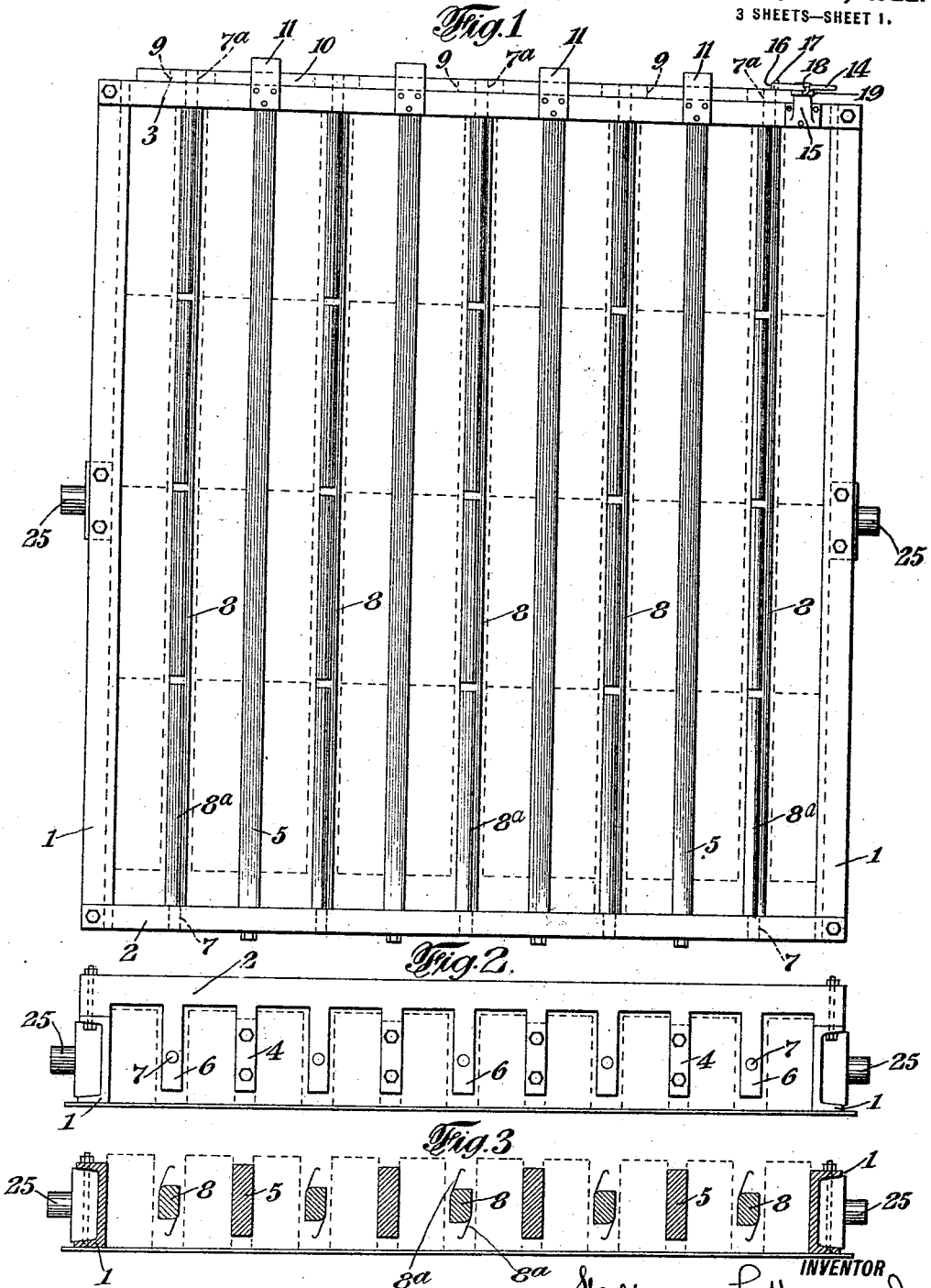

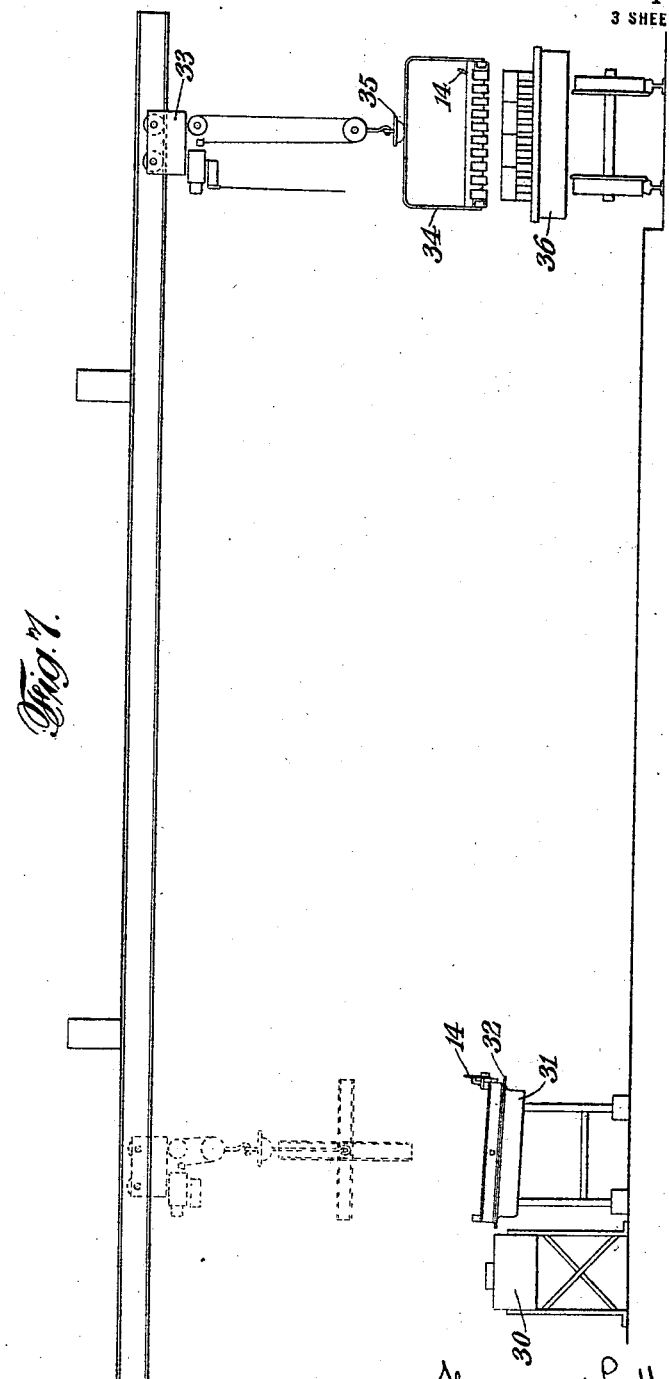

UNITED STATES PATENT OFFICE.

WILLIAM LEE HANLEY, JR., OF BRADFORD, PENNSYLVANIA.

APPARATUS FOR HACKING BRICKS.

1,413,402.   Specification of Letters Patent.   Patented Apr. 18, 1922.

Application filed September 21, 1920. Serial No. 411,764.

*To all whom it may concern:*

Be it known that I, WILLIAM L. HANLEY, Jr., a citizen of the United States, residing at Bradford, in the county of McKean and State of Pennsylvania, have invented certain new and useful Improvements in Apparatus for Hacking Bricks; and I do hereby declare the following to be a full, clear, and exact description of the invention, such as will enable others skilled in the art to which it appertains to make and use the same.

My invention consists in the novel features hereinafter described, reference being had to the accompanying drawings which illustrate one embodiment of the invention selected by me for purposes of illustration, and the said invention is fully disclosed in the following description and claims.

In the commercial production of bricks, after the formation of the bricks from moist clay in any desired manner, they are ordinarily placed on cars and conveyed to a drier, where a large percentage of the moisture is evaporated, after which the bricks are fired in suitable kilns. In order to transport the "green" or moist bricks advantageously it is customary to arrange them in a plurality of layers, one above another, the layers each comprising a plurality of closely arranged parallel rows, the rows of each layer extending perpendicularly to those of the adjacent layer above or below, each brick of each row in each layer above the bottom layer resting upon two bricks of the layer below it. The rows of bricks in each layer are ordinarily spaced a distance apart to afford opportunity for the passage of air through the pile of bricks to facilitate drying. The placing of the bricks in this built up formation is termed in the art "hacking" and is performed by hand labor, each individual brick being picked up by the hand of the operator and placed in position. In every brick plant a considerable number of "hackers" are always required to handle the bricks by hand from the pug mill or other brick making apparatus and place them on trucks or cars in the formation indicated, in which they can be moved in large numbers with the least danger of injury, and in which they can be most effectively dried. These hackers acquire great skill and dexterity in handling the bricks rapidly and placing them accurately, and they demand and receive proportionate wages as skilled operators.

The object of my invention is to provide mechanical means for hacking bricks, by means of which a great reduction in the number of operatives required is effected, thus very materially reducing the cost of the brick per thousand, and eliminating the use of skilled labor for this purpose. In carrying out my invention, I employ a number of receiving frames each having parallel channels adapted to receive a single layer of bricks in parallel spaced rows, covering an area substantially that of the car, or truck, or other supporting surface upon which the bricks are to be hacked. Each frame is provided with means for clamping the bricks frictionally so as to permit the frame to be lifted with the contained bricks, and to be inverted if desired as in handling faced bricks. In connection with the frames I prefer to employ a traveling hoist or crane for lifting the frame when loaded and carrying it to a point above the car, truck, or platform, and depositing the entire layer of bricks thereon or upon a previously placed layer, the proper perpendicular relation between the rows of adjacent layers being conveniently obtained by providing the hoist with a swivel or turntable so that alternate layers can be placed with their rows perpendicular to each other. The empty frame is supported upon a suitable stand or table adjacent to the carrying-off conveyor which receives the bricks from the brick machine, and they can be readily pushed into the channels with which the receiving frame is provided until all its channels are filled, when the bricks are clamped in the frame and locked. While one frame is being filled, another frame is being carried over the car and lowered upon it, or upon the topmost layer of bricks thereon, and after releasing the bricks the frame is lifted off and returned to the filling stand. The handling of the bricks is thus reduced to a minimum and the hacking can be effected by a greatly reduced number of men.

In the accompanying drawings,

Fig. 1 represents a plan view of one form of hacking or receiving frame, for carrying out my invention, selected by me for purposes of illustration, the bricks being indicated by dotted lines.

Fig. 2 is an elevation of the receiving side frame, showing the bricks in dotted lines.

Fig. 3 is a central sectional view of the frame showing in dotted lines the position of the bricks, the locking devices being shown in released position.

Fig. 4 is an enlarged detail view of a portion of Fig. 3, showing the locking devices in locking position.

Fig. 4$^a$ is a detail of a portion of one of the clamping bars.

Fig. 5 is a partial rear elevation of the frame showing the means for simultaneously operating and securing the locking devices.

Fig. 6 is a section on line 6—6 of Fig. 5.

Fig. 7 is a view illustrating the operation of hacking.

My improved hacking frame comprises in the preferred form illustrated in the accompanying drawings, the side plates 1, 1, preferably in the form of channel bars as shown, to give the required strength, and the end plates 2 and 3, bolted on the side plates. The end plate 2, at the receiving end of the frame, which I call the front end plate, is provided with a series of downwardly extending arms 4 which are bolted to stationary partition plates 5, said partition plates being located a distance apart greater than the width of two bricks. The front end plate is also provided with a plurality of hangers 6 located centrally of the spaces formed by said partition plates, said hangers being provided with bearing apertures for the trunnions 7 of the clamping bars 8. The rear end plate 3 is preferably a solid plate provided with bearing apertures for the trunnions 7$^a$ of the clamping bars, and the partition plates are securely bolted or screwed to the end plate 3.

The trunnions 7$^a$ of the clamping bars are extended through the end plate 3, and are provided with pinions 9 (see Fig. 6), all of which engage a transversely sliding rack 10, held in place by brackets 11 secured to the end plate 3, and having downwardly extending arms 12 provided with projections 13 extending into a guiding groove 10$^a$ in the outer face of the rack bar 10. By moving the rack bar longitudinally all of the clamping bars may be moved into and out of clamping position. I prefer to actuate the rack bar by means of a hand lever 14 (see Fig. 5) mounted in a bracket 15 secured to the end plate 3 and provided with a yoke 16 engaging a stud 17 on the rack bar, the lever 14 being provided with a locking pawl 18 for engaging a ratchet segment 19 secured to the bracket 15, or formed integrally therewith, for holding said lever locked when the clamping bars have been moved to clamping position.

The pivotally mounted clamping bars 8 are preferably provided on opposite sides with means for yieldingly clamping each individual brick, consisting in this instance of spring clamping plates 8$^a$ rigidly secured to the opposite faces of the bar, the spring plates on one side extending in one direction, and those on the opposite side extending in the opposite direction. Each clamping plate is preferably of about the length of a single brick, and the plates are so located longitudinally of the bar that when the frame is filled and the clamping bars are turned to clamp the bricks, each clamping plate will engage only one brick, the yielding character of the plates enabling them to accommodate themselves to any slight variations in the thickness of individual bricks, or any irregularities in the surfaces thereof. The clamping bars when turned to vertical or inoperative position act as partition members and divide the space between the permanent bars of the frame into channels on opposite sides of each clamping bar, of greater width than that of a brick. In this position, indicated in dotted lines in Fig. 4, and in full lines in Fig. 3, the lateral faces of the clamping bars and their spring clamping plates will assist in guiding the bricks into the channels or spaces between the clamping bars and stationary bars of the frame. When the clamping bars are turned to the position indicated in full lines in Fig. 4, the spring plates 8$^a$ are brought into frictional contact with the faces of the bricks of the two rows on opposite sides of the clamping bar and force the bricks against the adjacent partition bars (or side bars 1). The bricks will be firmly held in position in the frame when the clamping bars are turned into clamping position and locked, as the amount of surface of each brick frictionally engaged by the stationary frame bars, and the spring plates 8$^a$ of the clamping bars, is more than sufficient to raise the weight of the brick, without exerting any great amount of pressure upon them. In lifting the bricks I depend more on frictional contact than pressure, and the fact that the bricks are "green" (moist) enables me to more readily clamp and raise them. Each brick is held by an independently yielding grip and this insures the lifting of all the bricks in the frame.

Each frame is designed to lift a number of rows of bricks, each row containing a number of individual bricks. In the selected embodiment illustrated herein the frame is constructed to accommodate ten rows, of four bricks each, or forty bricks, constituting a single layer. It is obvious that the number of rows and the number of bricks in each row may be varied, but it is obvious that the shape and area of the surface of the frame should approximate that of the surface of the truck or car, or other supporting surface upon which the bricks are to be piled or "hacked". It will also be understood that when the frame is filled it will preferably be placed upon a smooth supporting surface or table, usually a metal plate, the surface of which may be greased if desired, in any usual or preferred manner, and the bricks are slid endwise into the channels or spaces between the stationary bars 1 and 5 and the clamping bars, until all the spaces are filled, the bricks being inserted at the side adjacent to the end bar 2, which facilitates their introduction into the frame, while the solid rear end bar 3 acts as a stop for each row of bricks as they are inserted. As soon as the frame is filled the lever 14 is actuated and locked, thus clamping all of the bricks in the frame, and the frame is ready to be lifted and transported to a position over the truck, car, or other supporting surface. It will be noted that the rows of bricks are spaced apart by the partition bars 5 of the frame, the bricks in each row being ordinarily in contact with each other, at the ends. When the frame is lowered upon the truck or car or other supporting surface (or upon a previously placed layer of bricks) the clamping lever 14 is released and thrown into a position to release the clamping bars 8, after which the frame is simply lifted clear of the bricks, leaving them placed and spaced as they were in the frame. As before stated, the successive layers of bricks are placed at right angles to each other.

For convenience in handling the frames, I prefer to provide them with suitable means for engaging a lifting bail and in the drawings I have shown the frame provided with trunnions 25—25, which are located centrally of the side bars 1—1, to balance the weight of the frame and load, and are preferably so arranged as to permit of inverting the frame in the bail. In handling so called "faced" brick which has had a very smooth finish imparted to one face of each brick, which is to form the exterior face when laid, it is necessary in hacking the "green" bricks that the smooth faces of one layer shall come into contact with the smooth faces of the next layer, as otherwise the smooth faces would be marred. I therefore prefer to form the bail and trunnions of the frame so that the frame can be inverted while suspended by the bail, so that after one layer has been deposited for example with the smooth face up, the layer carried by the next frame, which will come in the same position from the brick machine, can be inverted after the bricks are locked in the frame. The frame is also turned a quarter of a circle horizontally, and thus the next layer can be placed with the smooth faces down upon the smooth upper faces of a previous layer. In transporting the frame by means of the hoist it can be steadied by the hand of the operator although this is not necessary as the frame will remain in balanced condition in the bail.

In Fig. 7 I have shown a convenient arrangement of apparatus for filling and handling the hacking frames. 30 represents an endless conveyor, or bearing off belt for carrying the bricks from the pug mill, or other devices, by means of which the bricks are formed. 31 represents a table, preferably provided with an inclined top plate 32 of metal or other suitable material, sloping from the level of the belt 30 downward, and adapted to receive a frame or frames, into which the bricks are slid from the conveyor until the frame is filled. 33 represents a traveling hoist of any usual or preferred type, preferably an electric hoist, to which is attached the lifting bail 34, connected to the hoist through a swivel or turntable 35 of any well known or preferred construction, so that the alternate frames can be turned at right angles to their positions upon the filling table. It will be understood that a number of frames will be employed and while one frame is being filled another will be lifted by means of the hoist and bail and moved over the truck and rotated 90 degrees (and inverted if necessary), so as to deposit the successive layers of bricks upon the truck or car, for example, indicated at 36. As soon as a truck is loaded it is moved along suitable tracks to the drying room or chamber, where the bricks are dried in any desired manner.

It will be seen that the bricks can be readily and accurately hacked, or piled in the desired criss cross manner, with the proper spaces for the passage of air between them, by filling the frames and depositing an entire layer at a time in the manner described. It will also be seen that very few operatives are required and there is very little handling of the bricks by hand which not only reduces very materially the labor required, but also obviates the injury to the green bricks, and thus reduces materially the cost of manufacture.

What I claim and desire to secure by Letters Patent is:—

1. In apparatus for hacking bricks, a hacking frame comprising side frames, a front end bar provided with depending partition supports and intermediate hangers, a rear end bar forming a stop for the entering rows of bricks, partition bars rigidly secured to said end bars, oscillating clamping bars pivotally mounted in said hangers and the rear end bar, pinions connected with said clamping bars, a rack bar engaging said pinions, an operating lever for shifting said rack endwise, and locking means for holding said clamping bars in operative position.

2. In apparatus for hacking bricks, a hacking frame comprising side frames, a front end bar provided with depending partition supports and intermediate hangers, a rear end bar forming a stop for the entering rows of bricks, partition bars rigidly secured to said end bars, oscillating clamping bars pivotally mounted in said hangers and the rear end bar, pinions connected with said clamping bars, a rack bar engaging said pinions, an operating lever for shifting said rack endwise, and a locking device engaging said lever and holding said clamping bars in operative position.

3. In apparatus for hacking bricks, the combination with a horizontal frame for receiving an entire horizontal layer of bricks and provided with parallel channels open at the bottom, arranged to receive parallel rows of bricks in proper spaced relation from each other, clamping means for temporarily clamping the "green" bricks in said frame, locking means for said clamping means, and lifting and transporting mechanism for lifting said frame and depositing it upon a supporting surface, said lifting and transporting mechanism being provided with means for permitting the inversion of the frame while suspended by said lifting and transporting mechanism.

4. In apparatus for hacking bricks, the combination with a horizontal frame for receiving an entire horizontal layer of bricks and provided with parallel channels open at the bottom, arranged to receive parallel rows of bricks in proper spaced relation from each other, clamping means for temporarily clamping the "green" bricks in said frame, locking means for said clamping means, and lifting and transporting mechanism for lifting said frame and depositing it upon a supporting surface, including a lifting bail having a horizontally pivotal connection with the frame, said bail being constructed to permit the frame to be inverted therein by swinging it upon said pivotal connection to enable faced bricks to be placed with their smooth faces in contact.

5. In apparatus for hacking bricks, the combination with a lifting frame provided with parallel channels open at the bottom and at one end of the frame, for receiving an entire horizontal layer of bricks, means for simultaneously clamping all of said bricks in said channels, said frame being provided with horizontally disposed and central locking trunnions, and a lifting bail engaging said trunnions pivotally, and constructed to permit said frame to be inverted while suspended from the bail to permit faced bricks to be placed with their smooth faces in contact.

6. In apparatus for hacking bricks, the combination with a horizontal frame provided with parallel stationary members forming parallel channels open at the bottom, a pivotally mounted clamping bar extending transversely and centrally through each of said channels and dividing them into channels for receiving single rows of bricks, each of said clamping bars being provided with yielding clamping faces for engaging individual bricks of said rows, said clamping faces being arranged on opposite sides of the pivotal axis of the clamping bar and extending in opposite directions therefrom, and means for oscillating said clamping bars and holding them in clamped position.

7. In apparatus for hacking bricks, the combination with a horizontal frame provided with parallel stationary members forming parallel channels open at the bottom, a pivotally mounted clamping bar extending transversely and centrally through each of said channels and dividing them into channels for receiving single rows of bricks, each of said clamping bars being provided with yielding clamping faces for engaging individual bricks of said rows, said clamping faces being arranged on opposite sides of the pivotal axis of the clamping bar and extending in opposite direction therefrom, actuating means for simultaneously oscillating all of said clamping bars, and locking means for said actuating means.

8. In apparatus for hacking bricks, the combination with a horizontal frame provided with stationary parallel frame members forming channels of greater width than two parallel rows of bricks, said channels being open at the bottom and also open at one end of the frame, an oscillating clamping bar pivotally supported centrally of each of said channels, and dividing them into two channels for the reception of two rows of bricks, spring clamping plates for engaging individual bricks secured to each clamping bar on opposite sides of its pivotal axis, the clamping plates on one side of the bar extending in the opposite direction from the clamping plates on the other side of the bar, and means for oscillating the clamping bars and holding them in clamping position.

9. In apparatus for hacking bricks, the combination with a horizontal frame provided with stationary parallel frame members forming channels of greater width than two parallel rows of bricks, said channels being open at the bottom and also open at one end of the frame, an oscillating clamping bar pivotally supported centrally of each of said channels, and dividing them into two channels for the reception of two rows of bricks, spring clamping plates for engaging individual bricks secured to each clamping bar on opposite sides of its pivotal axis, the clamping plates on one side of the bar extending in the opposite direction from the clamping plates on the other side of the bar, and means for oscillating the clamping bars and holding them in clamping position, a lifting bail pivotally connected centrally to said frame and constructed to permit the frame to be inverted while suspended from said bail to permit faced bricks to be placed with the smooth faces of superimposed layers in contact.

10. The herein described process of hacking bricks, which consists in placing the brick in parallel rows in a single horizontal layer of the area of the pile to be made, lifting the entire horizontal layer simultaneously, inverting said layer, and placing it face downward upon a previously placed layer.

11. The herein described process of hacking bricks, which consists in placing the bricks in parallel rows in a single horizontal layer of the area of the pile to be made, lifting the entire horizontal layer simultaneously, inverting said layer, and placing it upon a previously placed horizontal layer, with the rows of bricks in the superposed layer at right angles to those of the layer below.

12. The herein described process of hacking bricks, which consists in placing bricks in parallel rows in a single horizontal layer of the area of the pile to be made, lifting the entire horizontal layer simultaneously, swinging the entire layer horizontally through an arc of at least 90°, inverting said layer and placing it upon a previously placed horizontal layer, with the bricks at right angles thereto.

13. The herein described process for hacking "faced" bricks, which consists in placing the faced bricks in parallel rows in horizontal layers of the area of the pile to be made, with the faced portions thereof in the same horizontal plane, lifting all the bricks in each layer simultaneously, and depositing them, one layer upon another, and inverting alternate layers so as to bring the faced portions of the bricks of one layer into contact with the faced portions of the bricks of another layer.

14. The herein described process for hacking faced bricks, which consists in placing the faced bricks in parallel rows in horizontal layers of the area of the pile to be made with the faced portions thereof in the same horizontal plane, lifting all the bricks in each layer simultaneously, and depositing them, one layer upon another, inverting alternate layers and swinging alternate layers horizontally through an arc of at least 90° to bring the faced portions of the bricks of one layers into contact with the faced portions of another layer, and disposed at right angles thereto.

In testimony whereof I affix my signature.

WILLIAM LEE HANLEY, Jr.